United States Patent
Katsura

(10) Patent No.: US 12,247,354 B2
(45) Date of Patent: Mar. 11, 2025

(54) METHOD FOR SUPPRESSING SEDIMENTATION OF SUSPENDED SUBSTANCE, METHOD FOR SUPPRESSING PITCH TROUBLE, AND METHOD FOR DETECTING SEDIMENTATION OF SUSPENDED SUBSTANCE

(71) Applicant: KURITA WATER INDUSTRIES LTD., Tokyo (JP)

(72) Inventor: Hiroki Katsura, Yokohama (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 331 days.

(21) Appl. No.: 17/642,702

(22) PCT Filed: Sep. 10, 2020

(86) PCT No.: PCT/JP2020/034301
§ 371 (c)(1),
(2) Date: Mar. 14, 2022

(87) PCT Pub. No.: WO2021/095342
PCT Pub. Date: May 20, 2021

(65) Prior Publication Data
US 2022/0325473 A1    Oct. 13, 2022

(30) Foreign Application Priority Data
Nov. 12, 2019   (JP) ................................ 2019-205069

(51) Int. Cl.
*D21C 9/00*     (2006.01)
*C02F 1/00*     (2023.01)
(Continued)

(52) U.S. Cl.
CPC .............. *D21C 9/008* (2013.01); *C02F 1/008* (2013.01); *C02F 1/24* (2013.01); *C02F 1/40* (2013.01);
(Continued)

(58) Field of Classification Search
CPC .......... D21F 1/66; D21F 1/68; D21F 1/70–82; D21D 5/28
See application file for complete search history.

(56) References Cited

U.S. PATENT DOCUMENTS

| | | | |
|---|---|---|---|
| 4,370,199 A | 1/1983 | Orndorff | |
| 2009/0114353 A1 | 5/2009 | Tachikawa et al. | |
| 2020/0407921 A1* | 12/2020 | Katsura | .................... D21C 9/08 |

FOREIGN PATENT DOCUMENTS

| | | | | |
|---|---|---|---|---|
| CN | 106525961 A | * | 3/2017 | ............. G01N 29/02 |
| CN | 109205777 A | * | 1/2019 | |

(Continued)

OTHER PUBLICATIONS

English Machine Translation CN106525961A1, 2017. (Year: 2017).*
(Continued)

*Primary Examiner* — Anthony Calandra
(74) *Attorney, Agent, or Firm* — JCIPRNET

(57) ABSTRACT

A method for suppressing sedimentation of suspended substances is a method for suppressing sedimentation of suspended substances in water at the bottom of a tank disposed in a water system in papermaking equipment, comprising a step of blowing an oxygen-containing gas into the water, for stirring and aeration; a step of detecting a change with time in existence states of the suspended substances in the tank by the stirring and the aeration; and a control step of feeding at least one of an oxygen-containing gas and a slime control agent to the tank based on the detection result to suppress the sedimentation of the suspended substances in the tank.

3 Claims, 7 Drawing Sheets

(51) Int. Cl.
  *C02F 1/24* (2023.01)
  *C02F 1/40* (2023.01)
  *C02F 1/50* (2023.01)
  *D21D 5/28* (2006.01)
  *D21F 1/66* (2006.01)
  *D21F 1/68* (2006.01)
  *D21F 1/70* (2006.01)
  *D21H 21/04* (2006.01)
  *D21H 23/08* (2006.01)
  *C02F 103/28* (2006.01)

(52) U.S. Cl.
  CPC ............... *C02F 1/50* (2013.01); *D21D 5/28* (2013.01); *D21F 1/66* (2013.01); *D21F 1/68* (2013.01); *D21F 1/70* (2013.01); *D21H 21/04* (2013.01); *D21H 23/08* (2013.01); *C02F 2103/28* (2013.01); *C02F 2209/02* (2013.01); *C02F 2209/10* (2013.01); *C02F 2209/11* (2013.01); *C02F 2303/20* (2013.01)

(56) References Cited

FOREIGN PATENT DOCUMENTS

| | | | | |
|---|---|---|---|---|
| EP | 3020862 | 5/2016 | | |
| JP | H09512063 | 12/1997 | | |
| JP | H10258203 | 9/1998 | | |
| JP | 2004017005 | 1/2004 | | |
| JP | 2004076215 | 3/2004 | | |
| JP | 2006272228 | 10/2006 | | |
| JP | 2008012424 | 1/2008 | | |
| JP | 2013240770 | 12/2013 | | |
| JP | 2015017334 | 1/2015 | | |
| JP | 5952230 | 7/2016 | | |
| JP | 6002095 | 10/2016 | | |
| JP | 2017110326 | 6/2017 | | |
| JP | 2019015427 | 1/2019 | | |
| KR | 100986303 B1 * | 10/2010 | ............. | B01D 21/28 |
| KR | 20160029739 | 3/2016 | | |
| WO | 9528521 | 10/1995 | | |
| WO | 2006137183 | 12/2006 | | |
| WO | 2012070644 | 5/2012 | | |
| WO | 2019176182 | 9/2019 | | |

OTHER PUBLICATIONS

English Machine Translation KR100986303B1, 2010. (Year: 2010).*
English Machine translation of Cn109205777A, 2019. (Year: 2019).*
"Office Action of Indonesia Counterpart Application", issued on Aug. 9, 2023, with English translation thereof, pp. 1-6.
"Office Action of Korea Counterpart Application", issued on Aug. 25, 2023, with English translation thereof, pp. 1-10.
"International Search Report (Form PCT/ISA/210) of PCT/JP2020/034301," mailed on Oct. 27, 2020, with English translation thereof, pp. 1-4.

* cited by examiner

METHOD FOR SUPPRESSING SEDIMENTATION OF SUSPENDED SUBSTANCE, METHOD FOR SUPPRESSING PITCH TROUBLE, AND METHOD FOR DETECTING SEDIMENTATION OF SUSPENDED SUBSTANCE

CROSS-REFERENCE TO RELATED APPLICATION

This application is a 371 application of the international PCT application serial no. PCT/JP2020/034301, filed on Sep. 10, 2020, which claims the priority benefit of Japan application no. 2019-205069, filed on Nov. 12, 2019. The entirety of each of the above-mentioned patent applications is hereby incorporated by reference herein and made a part of this specification.

TECHNICAL FIELD

The present invention relates to a method for suppressing sedimentation of suspended substances, a method for suppressing pitch trouble, and a method for detecting the sedimentation of suspended substances.

BACKGROUND ART

The manufacturing of paper (paper manufacturing) is conducted by making paper from raw material slurry in which pulp raw materials are dispersed in water. At the time of this paper manufacturing, a large amount of white water containing suspended substances derived from pulp raw materials such as fine fibers, starch, and a filler is discharged from a paper machine or the like. This white water is circulated around a water system in a papermaking process again and used as water for diluting raw materials from the viewpoint of the effective use or reuse of water resources.

However, in a tank in which white water resides for a long period of time, suspended substances contained in white water may precipitate and sediment at the bottom of the tank. When suspended substances thus sediment at the bottom of the tank, oxygen is not supplied thereinto, and the suspended substances become anaerobic. Anaerobic microorganisms grow, are activated, and release reducing substances in water to make the water anaerobic in such an environment. Since the water made anaerobic circulates around a water system in a papermaking process, and is used for diluting raw materials, the whole white water circulatory system becomes anaerobic, and anaerobic microorganisms are activated in the whole white water circulatory system. The thus activated anaerobic microorganisms decompose starch for improving the strength of paper, and paper having a desired strength may not be obtained. Since many of slime control agents used for suppressing slime produced from microorganisms are oxidizers, the reducing substances react with these slime control agents in the white water circulatory system, and the desired slime suppressing effect may not be obtained.

Furthermore, anaerobic microorganisms decompose and consume starch as described above to generate organic acid. Although calcium carbonate is meanwhile added to the white water circulatory system as a filler, this calcium carbonate reacts with the organic acid, is dissolved, and calcium ions increase in the white water circulatory system. The thus increased calcium ions inhibit the fixation of agents such as a paper durability agent, a sizing agent, and a dye for improving the qualities of paper on paper, and paper having desired qualities may not be obtained.

For example, Patent Documents 1 and 2 then disclose methods for aerating white water with oxygen-containing gas and changing the conditions of white water circulatory systems into aerobic conditions to suppressing the generation of reducing substances. According to such methods, the amounts of slime control agents added to the white water circulatory systems can be reduced.

CITATION LIST

Patent Documents

Patent Document 1: Japanese Patent No. 5952230
Patent Document 2: Japanese Patent No. 6002095

DISCLOSURE OF THE INVENTION

Problems to be Solved by the Invention

When the methods in Patent Documents 1 and 2 are performed, an oxygen-containing gas is usually fed to the white water in a fixed amount based on past actual results or the like. Since the amount of the suspended substances contained in the white water is not necessarily fixed, the amount of the suspended substances sedimented in a tank is not, however, necessarily fixed, either. Therefore, when a fixed amount of oxygen-containing gas is fed for operation, the fixed amount can be more or less than an amount required for making the suspended substances sedimented in the tank aerobic. Especially when the amount of oxygen-containing gas is short, anaerobic microorganisms are activated, reducing substances increase, and paper may not be able to be made appropriately. Therefore, the feed of oxygen-containing gas needs to be more appropriately controlled depending on the environment of the water system to be treated.

In the tank of papermaking equipment, a slime control agent is usually added if needed. For example, in Patent Documents 1 and 2, the oxidation-reduction potentials in the white water in the storage tanks are measured, and a slime control agent is added based on this oxidation-reduction potentials. However, the oxidation-reduction potentials do not change until the activation of anaerobic microorganisms. Even though the slime control agent is added thereafter in the case of rapid activation of the anaerobic microorganisms, or the like, the activation of anaerobic microorganisms cannot therefore be fully suppressed in some environments of the white water, and inferior goods may be produced. Therefore, the feed of the slime control agent needs to be more appropriately controlled depending on the environment of the water system to be treated.

Pitch containing starch, a sizing agent, latex, casein, and the like is further contained in water in the tank. Pitch trouble is caused by this pitch, and inferior goods may be produced. Therefore, a pitch control agent was added, and the occurrence of pitch trouble is suppressed. However, when sediment accumulates in the tank in papermaking equipment, the effect of the pitch control agent cannot be fully exhibited, and a large amount of the pitch control agent can be needed. Therefore, the feed of the pitch control agent needs to be appropriately controlled depending on the environment of the water system to be treated.

There is still room for improvement to reduce the production of inferior goods which resulted from sediment and pitch in the storage tank by controlling the feed amount of oxygen-containing gas, the slime control agent, or the pitch control agent appropriately when the papermaking equipment was continuously operated as mentioned above.

The present invention has been completed in view of the above actual situation, and the present invention provides a new method for suppressing sedimentation of suspended substances and a new method for suppressing pitch trouble which enable reducing the production of inferior goods which result from sediment and pitch produced from the storage tank by controlling oxygen-containing gas, a slime control agent, or a pitch control agent appropriately when the papermaking equipment is continuously operated, and a new method for detecting the sedimentation of suspended substances which can be used for methods like those.

Means for Solving the Problems

The present inventor has repeated examination earnestly to solve the above-mentioned problem, and have consequently found that, according to a method for suppressing sedimentation of suspended substances, wherein the method is for suppressing sedimentation of suspended substances in water at the bottom of a tank disposed in a water system in papermaking equipment, the method comprising: an aeration step of blowing an oxygen-containing gas into water which exists in the tank, for stirring and aeration; a detection step of detecting a change with time in existence states of suspended substances which exist in the water in the tank by the stirring and the aeration; and a control step of feeding at least one of an oxygen-containing gas and a slime control agent to the tank based on the detection result in the detection step during the operation of the papermaking equipment to suppress sedimentation of the suspended substances in the tank, the production of inferior goods which result from sediment in the storage tank can be reduced by controlling the feed amount of oxygen-containing gas, a slime control agent, or a pitch control agent more appropriately when the papermaking equipment is continuously operated, and completed the present invention. The present invention provides the following specifically.

(1) A method for suppressing sedimentation of suspended substances, wherein the method is for suppressing sedimentation of suspended substances in water at the bottom of a tank disposed in a water system in papermaking equipment, the method comprising: an aeration step of blowing an oxygen-containing gas into water which exists in the tank, for stirring and aeration; a detection step of detecting a change with time in existence states of suspended substances which exist in the water in the tank by the stirring and the aeration; and a control step of feeding at least one of an oxygen-containing gas and a slime control agent to the tank based on a detection result in the detection step during operation of the papermaking equipment to suppress sedimentation of the suspended substances in the tank.

(2) The method for suppressing sedimentation of suspended substances according to the above-mentioned (1), wherein, in the detection step, the change with time in existence states of the suspended substances which exist in the water in the tank is detected using at least one of a thermometer, a turbidimeter, an MLSS meter, and an ultrasonic sensor.

(3) The method for suppressing sedimentation of suspended substances according to the above-mentioned (1), wherein, in the detection step, the change with time in existence states of the suspended substances in the water which exist in the tank is detected based on a result of image analysis using an ultrasonic sensor.

(4) A method for suppressing pitch trouble, wherein the method is for suppressing production of pitch from a tank disposed in a water system in papermaking equipment, the method comprising: an aeration step of blowing an oxygen-containing gas into water which exists in the tank, for stirring and aeration; a detection step of detecting a change with time in existence states of suspended substances which exist in the water in the tank by the stirring and the aeration; and a control step of feeding at least one of an oxygen-containing gas and a pitch control agent to the tank based on a detection result in the detection step during operation of the papermaking equipment to suppress production of pitch in the tank.

(5) A method for detecting sedimentation of suspended substances, wherein the method is for detecting sedimentation of suspended substances in water at a bottom of a tank disposed in a water system in papermaking equipment, the method comprising: an aeration step of blowing an oxygen-containing gas into water which exists in the tank, for stirring and aeration; and a detection step of detecting a change with time in existence states of suspended substances which exist in the water in the tank by the stirring and the aeration.

Effects of the Invention

According to the present invention, a method for suppressing sedimentation of suspended substances and a method for suppressing pitch trouble which enable reducing the production of inferior goods which result from sediment in a storage tank by controlling the feed amount of oxygen-containing gas, a slime control agent, or a pitch control agent more appropriately when the papermaking equipment is continuously operated, and a method for detecting the sedimentation of suspended substances which can be used for methods like those can be provided.

PREFERRED MODE FOR CARRYING OUT THE INVENTION

Figure 1:
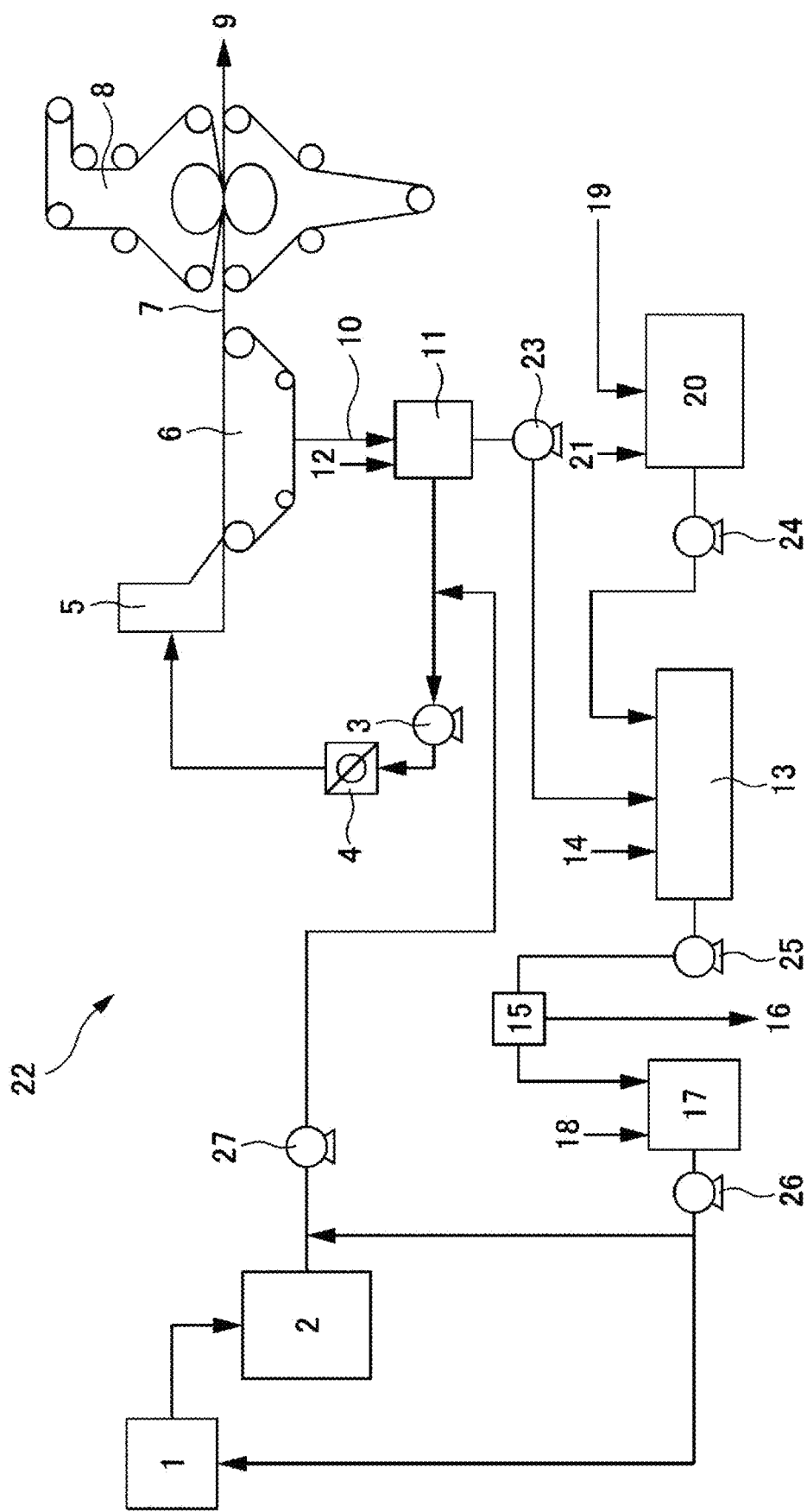
FIG. 1 is a figure showing one aspect of papermaking equipment according to the present embodiment.

Although specific embodiments of the present invention will be described in detail hereinafter, the present invention is not limited to the following embodiments at all, and the present embodiments can be suitably modified and implemented within the scope of the object of the present invention.

<<Method for Suppressing Sedimentation of Suspended Substances>>

A method for suppressing sedimentation of suspended substances according to the present embodiment is for suppressing sedimentation of suspended substances in water at the bottom of a tank disposed in a water system in papermaking equipment.

The method for suppressing sedimentation of suspended substances according to the present embodiment is more specifically characterized by comprising: an aeration step of blowing an oxygen-containing gas into water which exists in a tank, for stirring and aeration; a detection step of detecting a change with time in existence states of suspended substances which exist in the water in the tank by the stirring and the aeration; and a control step of feeding at least one of an oxygen-containing gas and a slime control agent to the tank based on a detection result in the detection step during the operation of papermaking equipment to suppress the sedimentation of the suspended substances in the tank.

As mentioned above, in conventional techniques, existence states of suspended substances in a tank were not confirmed during the operation of papermaking equipment, and a fixed type or a fixed amount of oxygen-containing gas was fed. However, when suspended substance sediments at the bottom, and oxygen-containing gas is not enough, anaerobic microorganisms increase in the sedimented suspended substances, and reducing substances additionally increase in water, and a required slime control agent increases.

Meanwhile, in the method for suppressing sedimentation of suspended substances according to the present embodiment, a change with time in existence states of suspended substances which exist in water in a tank by blowing an oxygen-containing gas into water for stirring and aeration is detected, and the feed of at least one of an oxygen-containing gas and a slime control agent to the tank based on the result of the detection during the operation of papermaking equipment is controlled.

At least one of an oxygen-containing gas and a slime control agent can be adjusted thereby depending on the states of the suspended substances in an actual tank. Especially suspended substances sedimented at the bottom of the tank among the suspended substances which exist in the tank can increase anaerobic microorganisms. The introduction of oxygen into the suspended substances sedimented at the bottom of the tank or the floating of the suspended substances by adjusting the aeration amount of oxygen-containing gas enables suppressing an increase in anaerobic microorganisms and suppressing the production of slime therefrom. Even though the suspended substances sediments at the bottom of the tank, and the inside thereof is anaerobic, the addition of a suitable amount of the slime control agent before anaerobic microorganisms increase enables suppressing a rapid increase in anaerobic microorganisms.

"Suppressing sedimentation of suspended substances" herein has at least one meaning of two which are to blow oxygen-containing gas into water which exists in a tank, for stirring and surface suspended substances sedimented at the bottom of a tank to suppress the sedimentation and to suppress slime produced from suspended substances by anaerobic microorganisms.

"Pulp raw materials" herein refer to raw materials to be manufactured into paper pulp. Specifically, the pulp raw materials comprise at least pulp, or may comprise various chemicals for papermaking besides.

The pulp in the pulp raw materials is not particularly limited. As the pulp, for example, chemical pulp such as broad-leaved tree bleached kraft pulp (LBKP), needle-leaved tree bleached kraft pulp (NBKP), broad-leaved tree unbleached kraft pulp (LUKP), or needle-leaved tree unbleached kraft pulp (NUKP); mechanical pulp such as ground pulp (GP), thermomechanical pulp (TMP), chemi-thermomechanical pulp (CTMP), or refiner mechanical pulp (RMP); recycled pulp recycled from used corrugated cardboard, used liner paper, used magazine paper, old newspapers, used land certificate paper, or the like; used fine white paper pulp; used de-inked paper pulp; or the like can be used. Among these, raw material pulp may be used alone or in combination of two or more.

Among the pulp raw materials, the chemicals for papermaking are not particularly limited. As the chemicals for papermaking, for example, a surfactant, a wax, a sizing agent, a filler, an antirust, a conductive agent, an antifoaming agent, a dispersant, a viscosity modifier, a flocculant, a coagulant, a paper strengthening agent, a yield improving agent, a paper powder fall preventing agent, a bulking agent, and the like can be used. Among these, chemical for papermaking may be used alone or in combination of two or more.

As long as the tank is disposed in the papermaking equipment, the tank is not particularly limited. Examples of the tank include white water silos, filtrate tanks, surplus white water tanks, and treated water tanks. Details of one example of the disposition thereof in the papermaking equipment, and the like will be mentioned below.

Hereinafter, the method for suppressing sedimentation of suspended substances according to the present embodiment will be described in detail step by step.

<Aeration Step>

The aeration step is a step of blowing an oxygen-containing gas into the water which exists in a tank, for stirring and aeration.

The conditions of the suspended substances sedimented at the bottom of the tank can be changed into aerobic conditions, and the suspended substances can be fluidized and floated by thus blowing an oxygen-containing gas into the water which exists in the tank. The generation of the reducing substances can be suppressed thereby, and the bond to parts and the like of the papermaking equipment through the hydrophobic groups of pitch can be physically suppressed by the above-mentioned fluidization action.

The oxygen-containing gas is not particularly limited. Examples of the oxygen-containing gas include oxygen gas alone and mixed gases such as air containing oxygen. Among these, mixed gases are preferable, and air is more preferable from the viewpoint of ease of acquisition. Nitrogen, carbon dioxide, or the like may be contained in mixed gas as gas other than oxygen. The oxygen-containing gases may be used alone or in combination of two or more.

The method for blowing an oxygen-containing gas is not particularly limited. Examples of the method include a method using a diffuser pipe. Specifically, air bubbles are discharged with the outlet of the diffuser pipe for air bubbles turned upward from the bottom of the tank, and efficiency in the contact of oxygen with water (especially sedimented suspended substances) can be enhanced. The diffuser pipe is not particularly limited. Examples of the diffuser pipe include a diffuser pipe having an exhaust port with a caliber of 1 mm or more and 5 mm or less. One diffuser pipe can also be used, or a plurality of diffuser pipes can also be used.

When a plurality of diffuser pipes is used, such exhaust ports is disposed, for example, at intervals of 5 cm or more and 50 cm or less.

As long as the position of the diffuser pipe is a position at which oxygen-containing gas is blown into the water which exists in the tank, the position is not particularly limited. The diffuser pipe may be disposed at at least one position inside the tank and outside the tank. When the diffuser pipe is provided in the tank, the position inside the tank is not particularly limited, either. At least one preferably discharges air bubbles upward from the bottom of the tank to blow oxygen-containing gas as mentioned above.

When the diffuser pipe is provided at the bottom, the amount of blowing through the diffuser pipe is not particularly limited. However, it is preferable that the amount be, for example, 0.5 $m^3$/hour or more and 10 $m^3$/hour or less per unit base area (1 $m^2$) of the tank per diffuser pipe. Blowing an oxygen-containing gas in such an amount of blowing enables efficient stirring and aeration and suppressing the activation of anaerobic microorganisms.

Oxygen-containing gas may be blown continuously or intermittently. When oxygen-containing gas is blown intermittently, time to blow oxygen-containing gas per once is not particularly limited. However, the time is 3 minutes or more and 30 days or less and preferably 4 minutes or more and 20 days or less. When the time to blow oxygen-containing gas is 3 minutes or more, oxygen can be fully fed to the water (especially sedimented suspended substances). Even though the time to blow oxygen-containing gas is more than 30 days, oxygen can be fully fed to the water, an effect corresponding thereto is not, however, obtained. Although time not to blow oxygen-containing gas is not particularly limited, the time is 3 minutes or more and 30 days or less and preferably 4 minutes or more and 20 days or less.

<Detection Step>

The detection step is a step of detecting a change with time in existence states of the suspended substances which exists in the water in the tank by the stirring and the aeration.

The method for detecting a change with time in existence states of the suspended substances is not particularly limited. Examples of the method include a method using at least one of a thermometer, a turbidimeter, an MLSS meter (mixed liquor suspended solids, activated sludge floating substances), an ultrasonic sensor, and a linear pipe. A method using at least one of a thermometer, a turbidimeter, and an ultrasonic sensor is preferable among these, and a method using at least an ultrasonic sensor is more preferable.

These may be detected continuously or intermittently. The obtained electric signals and data may be continuously or intermittently transmitted to a computer, a data logger, a sequencer, or the like by wire or wireless to record a change with time therein.

It is preferable to provide a mechanism for preventing the adhesion of dirt on a thermometer, a turbidimeter, a MLSS meter, or an ultrasonic sensor (for example, washing mechanism for performing periodic washing) from the viewpoint of performing accurate detection.

Hereinafter, several methods will be described specifically.

(Case Using Thermometer)

When suspended substances sediments at the bottom of the tank, water hardly flows in the parts, and the temperature is low as compared with a part which is above the parts and in which suspended substances do not sediment. Then, the height of the tank or the height of water (liquid height) (or a height half thereof or a fraction of the height thereof) is equally divided into a plurality of parts (for example, 2 or more), and thermometers are disposed at respective points (heights) in a straight line in the height direction. The existence of the suspended substances can be detected thereby in at least the parts in which the temperature is markedly low as compared with the upper part (for example, the temperature is low by 20% as compared with the value of a thermometer directly above the thermometer).

As long as the thermometers can measure the temperatures of the water in the tank, the thermometers are not particularly limited.

As long as at least two thermometers are provided in the height direction of the tank, the number of the thermometers is not particularly limited. As the number becomes larger, the temperature can be measured more accurately. Therefore, for example, it is preferable to provide three or more in the height direction of the tank, it is more preferable to provide four or more, and it is further preferable to provide five or more. The number of the thermometers in the height direction of the tank may be, for example, 1000 or less, 500 or less, 100 or less, 50 or less, 20 or less, or 10 or less.

The positions of the thermometers in the horizontal directions (surface direction perpendicular to the height direction of the tank) are not particularly limited, and the thermometers can be provided at all the points such as the vicinity of the wall surface and the center of the tank.

Although the plurality of thermometers disposed at equally divided intervals in the height direction only has to be disposed at only one place in a horizontal direction, the amount of the suspended substances sedimented may vary depending on the position in the horizontal direction. In preparation for such a case, the plurality of thermometers disposed at equally divided intervals in the height direction may be disposed at a plurality of places in the horizontal direction.

(Case Using Turbidimeter or MLSS Meter)

When suspended substances sediment at the bottom of the tank, the turbidity increases in the parts, and the turbidity is high as compared with a part which is above the parts and in which suspended substances do not sediment. Then, the height of the tank or the height of water (liquid height) (or a height half thereof or a fraction of the height thereof) is equally divided into a plurality of parts (for example, 2 or more), and turbidimeters or MLSS meters are disposed at respective points (heights) in a straight line in the height direction. At this time, all the plurality of turbidimeters or MLSS meters disposed in the height direction are disposed so as to face in the same direction among the horizontal directions (surface direction perpendicular to the height direction of the tank). Measurement is simultaneously performed at all the plurality of turbidimeters or MLSS meters disposed in the height direction. The existence of the suspended substances can be detected thereby in at least the parts in which the turbidity is markedly high as compared with the upper part (for example, the turbidity is high by 30% as compared with the value of a turbidimeter or a MLSS meter directly above the turbidimeter or the MLSS meter).

As long as at least two turbidimeters or MLSS meters are provided in the height direction of the tank, the number of the turbidimeters or the MLSS meters is not particularly limited. As the number becomes larger, the turbidity can be measured more accurately. Therefore, for example, it is preferable to provide three or more in the height direction of the tank, it is more preferable to provide four or more, and it is further preferable to provide five or more. The number of the turbidimeters or the MLSS meters in the height direction of the tank may be, for example, 1000 or less, 500 or less, 100 or less, 50 or less, 20 or less, or 10 or less.

The positions of the turbidimeters or the MLSS meters in the horizontal directions (surface direction perpendicular to the height direction of the tank) are not particularly limited, and the turbidimeters or the MLSS meters can be provided at all the points such as the vicinity of the wall surface and the center of the tank.

The facings of the turbidimeters or the MLSS meters among the horizontal directions (surface direction perpendicular to the height direction of the tank) are not particularly limited. Although the turbidimeters or the MLSS meters can be turned to all the points such as the vicinity of the wall surface and the center of the tank, distance enough to measure the turbidity needs to be secured between the positions including the positions in the horizontal directions.

Although the plurality of turbidimeters or MLSS meters disposed at equally divided intervals in the height direction only has to be disposed at only one place in the horizontal direction, the amount of the suspended substances sedimented may vary depending on the position in the horizontal direction. In preparation for such a case, the plurality of turbidimeters or MLSS meters disposed at equally divided intervals in the height direction may be disposed at a plurality of places in the horizontal direction.

Examples also include a method for measuring the turbidity while moving a turbidimeter or a MLSS meter along the height direction of a tank besides the method for providing a plurality of turbidimeters or MLSS meters in the height direction of a tank.

(Case Using Ultrasonic Sensor)

Ultrasonic waves damps gradually during the propagation. When there is the boundary between different physical properties (acoustic impedances) on the way of the propagation path, some of the ultrasonic waves reflect on the boundary, and propagate in the opposite direction. An ultrasonic sensor is disposed on or near the water surface, and irradiates ultrasonic waves from the water surface in the direction of the bottom of the tank, and the reflected waves are detected with the ultrasonic sensor by utilizing this phenomenon. Since a part in which suspended substances sediment is different in physical properties from normal water, the part in which the suspended substances sediment can be distinguished from the part in which suspended substances do not sediment. This detection result may be obtained at least one-dimensionally in the height direction of the tank, or may be obtained as an image analysis result two-dimensionally. The result thus obtained using the ultrasonic sensor reflects actual sediment in the tank with high accuracy, and the existence states (especially the sedimentation state) of the suspended substances can be detected with high accuracy even as compared with other methods. Especially the two-dimensional image analysis result enables detecting the existence states (especially sedimentation state) of the suspended substances with higher accuracy.

The number of ultrasonic sensors is not particularly limited, and any number of one or more may be provided. If at least one is provided, measurement is possible.

(Case Using Linear Pipe)

A linear pipe which has both open ends and is longer than the water surface height in the tank is inserted from the water surface to the bottom. When one end reaches the bottom of the tank, the other end is then sealed, and the pipe is pulled up; the height direction in the pipe reflects the existence states of the suspended substances in the height direction in the tank.

In the detection step, the oxidation-reduction potential of the water in the tank may be measured besides the above-mentioned existence states of the suspended substances in the water.

(Case Using Oxidation-Reduction Potentiometer)

At least one oxidation-reduction potentiometer is disposed, and the oxidation-reduction potential of the water in the tank only has to be measured. However, when the sedimentation of the suspended substances at the bottom of the tank furthermore allows the water to be anaerobic and anaerobic microorganisms to increase, the oxidation-reduction potential decreases in the parts, the oxidation-reduction potential is low as compared with a part which is above the parts and in which the suspended substances do not sediment, and an error may be caused. Then, the height of the tank or the height of water (or a height half thereof or a fraction of the height thereof) is equally divided into a plurality of parts (for example, 2 or more), and oxidation-reduction potentiometers are disposed at respective points (heights) in a straight line in the height direction. The existence of anaerobic microorganisms can be detected at least in the part in which the oxidation-reduction potential is markedly low as compared with the upper part thereby.

The number of the oxidation-reduction potentiometers is not particularly limited. As the number becomes larger, the oxidation-reduction potential can be measured more accurately. For example, it is preferable to provide three or more in the height direction of the tank, it is more preferable to provide four or more, and it is further preferable to provide five or more. The number of the oxidation-reduction potentiometers in the height direction of the tank may be, for example, 1000 or less, 500 or less, 100 or less, 50 or less, 20 or less, or 10 or less.

The positions of the oxidation-reduction potentiometers in the horizontal directions (surface direction perpendicular to the height direction of the tank) are not particularly limited, and the oxidation-reduction potentiometers can be provided at all the points such as the vicinity of the wall surface and the center of the tank.

The facings of the oxidation-reduction potentiometers among the horizontal directions (surface direction perpendicular to the height direction of the tank) are not particularly limited. Although the oxidation-reduction potentiometers can be turned to all the points such as the vicinity of the wall surface and the center of the tank, distance enough to measure the turbidity needs to be secured between the positions including the positions in the horizontal directions.

Although the plurality of oxidation-reduction potentiometers disposed at equally divided intervals in the height direction only has to be disposed at only one place in the horizontal direction, the amount of the suspended substances sedimented may vary depending on the position in the horizontal direction. In preparation for such a case, the plurality of oxidation-reduction potentiometers disposed at equally divided intervals in the height direction may be disposed at a plurality of places in the horizontal direction.

Examples also include a method of measuring the oxidation-reduction potential while moving an oxidation-reduction potentiometer along the height direction of a tank besides the method for providing a plurality of oxidation-reduction potentiometers in the height direction of a tank.

This oxidation-reduction potential may be detected continuously or intermittently. The obtained electric signals and data may be continuously or intermittently transmitted to a computer, a data logger, a sequencer, or the like by wire or wireless to record a change with time therein.

It is preferable to provide a mechanism for preventing the adhesion of dirt on the oxidation-reduction potentiometer (for example, washing mechanism for performing periodic washing) from the viewpoint of performing accurate detection.

<Control Step>

The control step is a step of feeding at least one of an oxygen-containing gas and a slime control agent to the tank based on the detection result in the detection step during the operation of the papermaking equipment to suppress the sedimentation of the suspended substances in the tank.

Although the method for feeding oxygen-containing gas based on the detection result in the detection step is not particularly limited, examples include increase or decrease in the amount of oxygen-containing gas, increase or decrease in the amount of oxygen in oxygen-containing gas, increase or decrease in the gas feed rate, and increase or decrease in gas feed pressure.

Although the method for feeding the slime control agent based on the detection result in the detection step is not particularly limited, examples include increase or decrease in the amount of the slime control agent, increase or decrease in the concentration of the slime control agent (in the case where a solvent or the like is mixed and added), and increase or decrease in the addition interval (in the case where the slime control agent is added intermittently).

Hereinafter, specific control of the feed of oxygen-containing gas and the slime control agent will be described by the methods for detecting a change with time in existence states of the suspended substances in the detection step.

When the ultrasonic sensor is used, the height of the suspended substance sedimented at the bottom of the tank is obtained directly. It is analyzed with reference to the detection result in the detection step with the heights of the sedimented suspended substances before and after the oxygen-containing gas is blown into the white water which exists in the tank for the predetermined time compared how the height of the sedimented suspended substances changes. For example, when the height of the suspended substances after oxygen-containing gas is blown increases by 0 to 10% as compared with the height of the suspended substances before oxygen-containing gas is blown, the aeration amount of oxygen-containing gas per unit time or the added amount of the slime control agent after the time is reduced by 5 to 10% based on the aeration amount of oxygen-containing gas per unit time or the added amount of the slime control agent before the time. When the height of the suspended substances after oxygen-containing gas is blown increases by 10 to 20% as compared with the height of the suspended substances before oxygen-containing gas is blown, the aeration amount of oxygen-containing gas per unit time or the added amount of the slime control agent after the time is reduced by 0 to 5% based on the aeration amount of oxygen-containing gas per unit time or the added amount of the slime control agent before the time. Furthermore, when the height of the suspended substances after oxygen-containing gas is blown increases by 20% or more as compared with the height of the suspended substances before oxygen-containing gas is blown, the aeration amount of oxygen-containing gas per unit time or the added amount of the slime control agent after the time is increased by 10% or more based on the aeration amount of oxygen-containing gas per unit time or the added amount of the slime control agent before the time.

When the thermometers, the turbidimeters, or the MLSS meters are used, the temperature (thermometers) or the turbidity (turbidimeters or MLSS meters) in the suspended substances sedimented at the bottom of the tank is obtained. It is analyzed with reference to the detection result in the detection step with the temperature or the turbidity of the sedimented suspended substances before and after the oxygen-containing gas is blown into the white water which exists in the tank for the predetermined time compared how the temperature or the turbidity of the sedimented suspended substances changes. For example, when the temperature or the turbidity of the suspended substances after oxygen-containing gas is blown increases by 0 to 10% as compared with the temperature or the turbidity of the suspended substances before oxygen-containing gas is blown, the aeration amount of oxygen-containing gas per unit time or the added amount of the slime control agent after the time is reduced by 5 to 10% based on the aeration amount of oxygen-containing gas per unit time or the added amount of the slime control agent before the time. When the temperature or the turbidity of the suspended substances after oxygen-containing gas is blown increases by 10 to 20% as compared with the temperature or the turbidity of the suspended substances before oxygen-containing gas is blown, the aeration amount of oxygen-containing gas per unit time or the added amount of the slime control agent after the time is reduced by 0 to 5% based on the aeration amount of oxygen-containing gas per unit time or the added amount of the slime control agent before the time. Furthermore, when the temperature or the turbidity of the suspended substances after oxygen-containing gas is blown increases by 20% or more as compared with the temperature or the turbidity of the suspended substances before oxygen-containing gas is blown, the aeration amount of oxygen-containing gas per unit time or the added amount of the slime control agent after the time is increased by 10% or more based on the aeration amount of oxygen-containing gas per unit time or the added amount of the slime control agent before the time.

The slime control agent is not particularly limited. Examples of the slime control agent include organic antimicrobial agents and inorganic antimicrobial agents.

The organic antimicrobial agents are not particularly limited. Examples of the organic antimicrobial agents include methylene bisthiocyanate, 5-chloro-2-methyl-4-isothiazolin-3-one, 2-methyl-4-isothiazolin-3-one, 4,5-dichloro-2-n-octyl-isothiazolin-3-one, 1,2-benzisothiazolin-3-one, 2-n-octylisothiazolin-3-one, sodium dimethyldithiocarbamate, 2,2-dibromo-3-nitrilopropionamide, 2-bromo-2-bromomethylglutaronitrile, 2-bromo-2-nitropropane-1,3-diol, 2,2-dibromo-2-nitroethanol, 1,1-dibromo-1-nitro-2-propanol, 1,1-dibromo-1-nitro-2-acetoxyethane, 1,1-dibromo-1-nitro-2-acetoxypropane, 2-bromo-2-nitro-1,3-diacetoxypropane, tribromonitromethane, β-bromo-β-nitrostyrene, 5-bromo-5-nitro-1,3-dioxane, 5-bromo-2-methyl-5-nitro-1,3-dioxane, 1,2-bis(bromoacetoxy)ethane, 1,2-bis(bromoacetoxy)propane, 1,4-bis(bromoacetoxy)-2-butene, methylene bisbromoacetate, benzyl bromoacetate, N-bromoacetamide, 2-bromoacetamide, dichloroglyoxime, α-chlorobenzaldoxime, α-chlorobenzaldoxime acetate, 2-(p-hydroxyphenyl)glyoxylohydroxymoyl chloride, triiodoallyl alcohol, 5-chloro-2,4,6-trifluoroisophthalonitrile, 2,4,5,6-tetrachloroisophthalonitrile, 3,3,4,4-tetrachlorotetrahydrothiophene-1,1-dioxide, 4,5-dichloro-1,2-dithiol-3-one, hexabromodimethylsulfone, glutaraldehyde, ortho-phthalaldehyde, dichlorophen, and quaternary ammonium salts.

Among these, 2,2-dibromo-3-nitrilopropionamide and 2,2-dibromo-2-nitroethanol, which can be expected to exhibit a higher antimicrobial effect, are preferable.

The inorganic antimicrobial agents are not particularly limited. Examples of the inorganic antimicrobial agents include hypochlorites such as sodium hypochlorite, potassium hypochlorite, calcium hypochlorite, and barium hypochlorite; chlorine dioxide; chlorinated isocyanuric acid; and combined chlorine type compounds.

Among these, sodium hypochlorite and combined chlorine type compounds, which have moderate oxidizing power and low reactivity with dissolved organic matter, are preferable.

A combined chlorine type compound is usually generated by reacting a chlorine donor, which releases free chlorine, with any of ammonia, an ammonium salt, and an organic nitrogen compound under suitable conditions. The chlorine donor is not particularly limited. For example, sodium hypochlorite is used. Examples of the ammonium salt include ammonium halides such as ammonium chloride and an ammonium bromide; ammonium sulfate; and ammonium nitrate. For example, as the organic amine, sulfamic acid, urea, or the like is also used. A compound which produces hypochlorous acid and/or hypobromous acid in water is also good, and examples include chlorine, chlorine dioxide, high test bleaching powder, hypochlorous acid, sodium hypochlorite, potassium hypochlorite, calcium hypochlorite, ammonium hypochlorite, magnesium hypochlorite, hypobromous acid, sodium hypobromite, potassium hypobromite, calcium hypobromite, ammonium hypobromite, magnesium hypobromite, chlorinated and/or brominated hydantoins, chlorinated and/or brominated isocyanuric acid, sodium salts thereof and potassium salts thereof.

A combined chlorine type compound produced according to a known method can also be used, the combined chlorine type compound is also commercially available, for example, as a "Fuzzicide" (R) produced by Kurita Water Industries Ltd. This "Fuzzicide" (R) is a reaction product obtained by reacting ammonium bromide and sodium hypochlorite at 1:1 (molar ratio)

The slime control agent may be used alone or in combination of two or more. The slime control agent may be added at a time, or may be divided into a plurality of portions and added in a plurality of steps.

The method for adding a slime control agent to the water system is not particularly limited. The slime control agent may be added as it is, and the slime control agent can also be dissolved or dispersed in a solvent and used as a solution. The above-mentioned solvent is not particularly limited. Examples of the solvent include water, organic solvents, and mixed solvents thereof.

The amount of the slime control agent added to the water system is not particularly limited. The amount is 0.1 mg/l or more and 1000 mg/l or less and preferably 1 mg/l or more and 100 mg/l or less in terms of the solid content. When the concentration is 0.1 mg/l or more and 1000 mg/l or less, the production of slime tends to be able to be fully suppressed.

The aeration and the addition of the slime control agent may be performed simultaneously, or a pause may be put between the aeration and the addition of the slime control agent.

<<Method for Suppressing Pitch Trouble>>

The method for suppressing pitch trouble according to the present embodiment is for suppressing the production of pitch from the tank disposed in the water system in the papermaking equipment.

More specifically, the method for suppressing pitch trouble according to the present embodiment comprises an aeration step of blowing an oxygen-containing gas into water which exists in a tank, for stirring and aeration; a detection step of detecting a change with time in existence states of suspended substances which exist in the water in the tank by the stirring and the aeration; and a control step of feeding at least one of an oxygen-containing gas and a pitch control agent to the tank based on a detection result in the detection step during the operation of papermaking equipment to suppress the production of pitch in the tank.

The pitch trouble suppression effect of the pitch control agent greatly depends on the sedimentation state of the suspended substances in the tank as mentioned above. Then, a change with time in existence states of the suspended substances in the tank is detected, and at least one of an oxygen-containing gas and the pitch control agent is fed based on the detection result. The pitch control agent can be added in a suitable amount in view of the change with time in existence states of the suspended substances in the tank thereby.

Since the aeration step and the detection step are the same as those of the above-mentioned method for suppressing sedimentation, only a control step will be described here.

<Control Step>

The control step is a step of feeding at least one of an oxygen-containing gas and a pitch control agent to the tank based on the detection result in the detection step during the operation of the papermaking equipment to suppress the production of pitch in the tank.

Hereinafter, specific control of the feed of oxygen-containing gas and the pitch control agent will be described depending on each of the methods for detecting a change with time in existence states of the suspended substances in the detection step. Since both of the aeration step and the detection step are the same as those of the above-mentioned method for suppressing sedimentation of suspended substances, detailed description here is omitted.

When the ultrasonic sensor is used, the height of the suspended substance sedimented at the bottom of the tank is obtained directly. It is analyzed with reference to the detection result in the detection step with the heights of the sedimented suspended substances before and after the oxygen-containing gas is blown into the white water which exists in the tank for the predetermined time compared how the height of the sedimented suspended substances changes. For example, when the height of the suspended substances after oxygen-containing gas is blown increases by 0 to 10% as compared with the height of the suspended substances before oxygen-containing gas is blown, the aeration amount of oxygen-containing gas per unit time or the added amount of the pitch control agent after the time is reduced by 5 to 10% based on the aeration amount of oxygen-containing gas per unit time or the added amount of the pitch control agent before the time. When the height of the suspended substances after oxygen-containing gas is blown increases by 10 to 20% as compared with the height of the suspended substances before oxygen-containing gas is blown, the aeration amount of oxygen-containing gas per unit time or the added amount of the pitch control agent after the time is reduced by 0 to 5% based on the aeration amount of oxygen-containing gas per unit time or the added amount of the pitch control agent before the time. Furthermore, when the height of the suspended substances after oxygen-containing gas is blown increases by 20% or more as compared with the height of the suspended substances before oxygen-containing gas is blown, the aeration amount of oxygen-containing gas per unit time or the added amount of the pitch control agent after the time is increased by 10% or more based on the aeration amount of oxygen-containing gas per unit time or the added amount of the pitch control agent before the time.

When the thermometers, the turbidimeters, or the MLSS meters are used, the temperature (thermometers) or the turbidity (turbidimeters or MLSS meters) in the suspended substances sedimented at the bottom of the tank is obtained. It is analyzed with reference to the detection result in the detection step with the temperatures or the turbidities of the sedimented suspended substances before and after the oxygen-containing gas is blown into the white water which exists in the tank for the predetermined time compared how the temperature or the turbidity of the sedimented suspended substances changes. For example, when the temperature or the turbidity of the suspended substances after oxygen-containing gas is blown increases by 0 to 10% as compared with the temperature or the turbidity of the suspended substances before oxygen-containing gas is blown, the aeration amount of oxygen-containing gas per unit time or the added amount of the pitch control agent after the time is reduced by 5 to 10% based on the aeration amount of oxygen-containing gas per unit time or the added amount of the pitch control agent before the time. When the temperature or the turbidity of the suspended substances after oxygen-containing gas is blown increases by 10 to 20% as compared with the temperature or the turbidity of the suspended substances before oxygen-containing gas is blown, the aeration amount of oxygen-containing gas per unit time or the added amount of the pitch control agent after the time is reduced by 0 to 5% based on the aeration amount of oxygen-containing gas per unit time or the added amount of the pitch control agent before the time. Furthermore, when the temperature or the turbidity of the suspended substances after oxygen-containing gas is blown increases by 20% or more as compared with the temperature or the turbidity of the suspended substances before oxygen-containing gas is blown, the aeration amount of oxygen-containing gas per unit time or the added amount of the pitch control agent after the time is increased by 10% or more based on the aeration amount of oxygen-containing gas per unit time or the added amount of the pitch control agent before the time.

The pitch control agent is not particularly limited. Examples of the pitch control agent include surfactants (cationic surfactants, anionic surfactants, and nonionic surfactants), polymers (water-soluble polymers, cationic monomers, cationic polymers, anionic polymers, amphoteric polymers, nonionic polymers, alkali compounds, copolymers, quaternary ammonium-based polymers, ester-based polymers, ether-based polymers, alcohol-based polymers, glycol-based polymers, ether ester-based polymers, methacrylic polymers, polyvinyl alcohol, polyamides, acrylamide, polyether ester amides, alkylamines, alkylenediamines, diallylamine, polyethyleneimine, pyrrolidone, polyamine/epihalohydrin, hydroxyalkylcelluloses, modified silicone, a phenol resin, a polyvinyl acetal resin, a melamine resin, a urethane resin, poloxamers, and terpene alcohol-based polymers), inorganic materials (inorganic salts, alkali metal salts, aluminium compounds, iron compounds, calcium compounds, talc, bentonite, zeolites, diatomite, mica, and white carbon), starch, proteins, enzymes, cyclodextrin, water-soluble cellulose, organic acids, phosphonic acid, gluconic acid, malic acid, citric acid, acetic acid, sulfonic acid, maleic acid, tartaric acid, lactic acid, glycolic acid, sulfuric acid, waxes, mineral oils, vegetable oils, animal oils, emulsifiers, oxidizers, and chelating agents.

As the pitch control agent, for example, "Spanplus" (R) produced by Kurita Water Industries Ltd. is commercially available. The pitch control agent may be used alone or in combination of two or more. The pitch control agent may be added at a time, or may be divided into a plurality of portions and added in a plurality of steps. The amount of the pitch control agent added to the water system is not particularly limited. The amount is 0.1 mg/l or more and 10,000 mg/l or less based on SS.

<<Method for Detecting Sedimentation of Suspended Substances>>

The method for detecting sedimentation of suspended substances according to the present embodiment is a method for detecting sedimentation of suspended substances, wherein the method is for detecting sedimentation of suspended substances in the white water at the bottom of the tank disposed in at least one of the white water circulatory system, through which the white water containing the suspended substances derived from components in pulp raw materials circulates, and the water system introduced into the white water circulatory system in the papermaking equipment.

More specifically, the method for detecting the sedimentation of suspended substances according to the present embodiment is characterized by comprising: an aeration step of blowing an oxygen-containing gas into white water which exists in a tank, for stirring and aeration; and a detection step of detecting a change with time in existence states of suspended substances in the white water which exists in the tank by the stirring and the aeration.

Such a method for detecting sedimentation is useful when control such as the maintenance of the papermaking equipment is performed based on the amount of the suspended substances sedimented in the tank as represented by the above-mentioned method for suppressing sedimentation of suspended substances and method for suppressing pitch trouble.

<<Example of Papermaking Equipment>>

Hereinafter, papermaking equipment to which the above-mentioned method for suppressing sedimentation of suspended substances and method for detecting the sedimentation of suspended substances can be applied will be specifically described using a figure. The present invention is not limited to the following specific papermaking equipment at all.

FIG. 1 is a figure showing one aspect of the papermaking equipment according to the present embodiment. An apparatus 1 for producing raw material pulp slurry is an apparatus for producing raw material pulp slurry, and is connected with a machine tank 2 through piping. The machine tank 2 is a tank for keeping the raw material pulp slurry and sending the raw material pulp slurry through a screen 4 to an inlet 5 with a fan pump 27 and a fan pump 3. The raw material pulp slurry sent to the inlet 5 is fed to a wire part 6 and dehydrated. A dehydrated wet sheet 7 is sent from a press part 8 to a drier part 9. White water 10 separated in the wire part 6 is stored in a white water silo 11. Some of the white water stored in the white water silo 11 is sent to the inlet 5 with raw materials, and is sent also to a surplus white water tank 13 through a fan pump 23. The white water sent to the surplus white water tank 13 is sent to a solid-liquid separation apparatus 15 through a fan pump 25, and the solid contents are discharged or collected in a raw material system (16). Meanwhile, the filtrate produced in the solid-liquid separation apparatus 15 is mixed with pulp slurry discharged from the apparatus 1 for producing raw material pulp slurry or the machine tank 2 through a fan pump 26 and introduced into a white water circulatory system. A water system 19 introduced into the white water circulatory system is stored in a treated water tank 20 and then introduced through a fan pump 24 into the surplus white water tank 13. Slime control agents 12, 14, 18, and 21 are added to the white water silo 11, the surplus white water tank 13, a filtrate tank 17, and the treated water tank 20, respectively.

In such papermaking equipment, the above-mentioned method for suppressing sedimentation of suspended substances and method for detecting the sedimentation of suspended substances can be applied to not only the white water circulatory system (papermaking system) but also all the tanks disposed in the papermaking equipment. Specifically, the method for suppressing sedimentation of suspended substances and the method for detecting the sedimentation of suspended substances are effective in suppressing sedimentation of the suspended substances and detecting the sedimentation of the suspended substances in tanks such as the white water silo 11, the surplus white water tank 13, the filtrate tank 17, and the treated water tank 20.

In such tanks, the production of inferior goods resulting from sediment and pitch in the storage tank can be reduced by aerating the water in the tanks with oxygen-containing gas and detecting the states of the sediment, and adding at least one of an oxygen-containing gas, a slime control agent, and a pitch control agent based on the result to suppress of the sediment or suppress pitch trouble.

EXAMPLES

Although the present invention will be described using the Examples specifically hereinafter, the present invention is not limited to these.

Test Example 1

White water in a cylindrical surplus white water tank having a height of 4 m and a diameter of 4 m provided in papermaking equipment was continuously aerated with air at 2 m$^3$/hour per unit area of 1 m$^2$ with respect to the base area of the tank per diffuser pipe using diffuser pipes having a caliber of 2 mm and provided at intervals of 10 cm in the height direction. First, the surplus white water tank was cleaned to remove sediment completely, and the operation was then started. When 8 days elapsed from the start, the operation was stopped temporarily. The inside of the tank was cleaned for 2 days to remove sediment completely. Then, the papermaking equipment was operated again for 9 days (after 19 days elapsed from the initial start), and the operation was stopped thereafter. The temperature of water in the surplus white water tank was measured during the operation of papermaking equipment by the method shown below.

Test Example 2

A test was performed in the same way as in Test Example 1 except that the turbidity of water in the surplus white water tank was measured.

Test Example 3

A test was performed in the same way as in Test Example 1 except that water in the surplus white water tank was subjected to image analysis using an ultrasonic sensor.

Control Test Example 1

A test was performed in the same way as in the above-mentioned Test Example 1 except that aeration with air was not conducted.

Control Test Example 2

A test was performed in the same way as in the above-mentioned Test Example 2 except that aeration with air was not conducted.

Control Test Example 3

A test was performed in the same way as in the above-mentioned Test Example 3 except that aeration with air was not conducted.

Test Examples 1 to 3 and Control Test Examples 1 to 3 were not performed at the same time.

(Measurement of Temperature)

Figure 2:
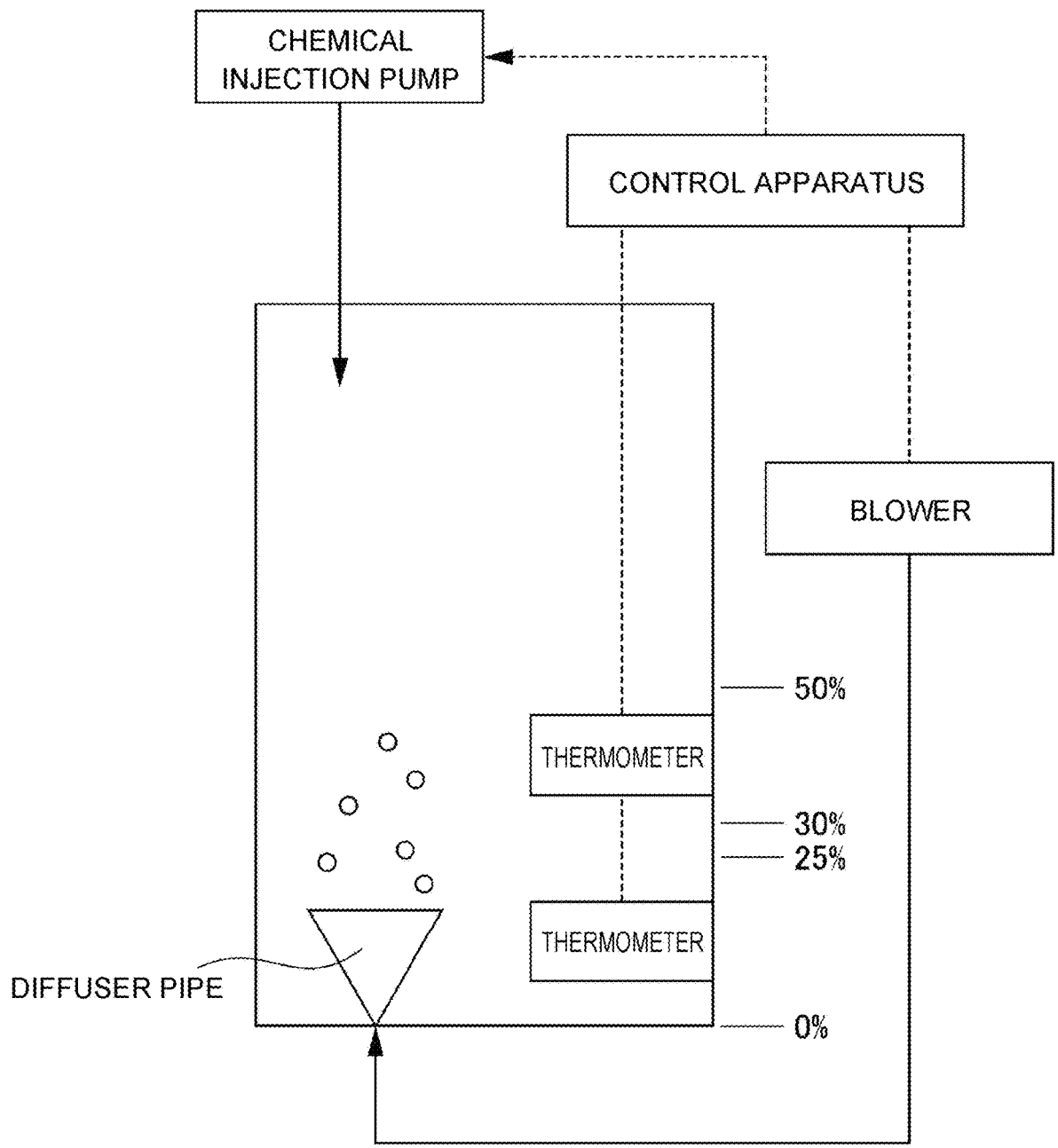
FIG. 2 is a longitudinal section schematic diagram of a tank for illustrating a method for measuring the temperature.
Figure 3:
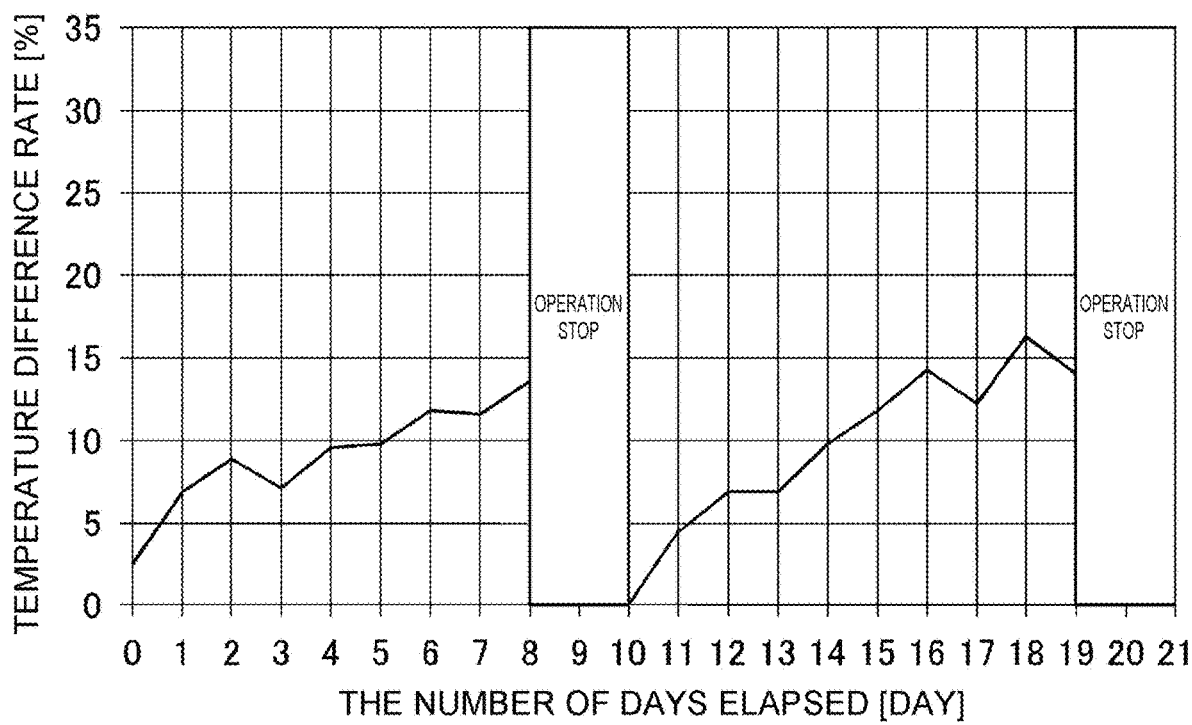
FIG. 3 is a graph showing a change with time in temperature difference rate in Test Example 1.
Figure 4:
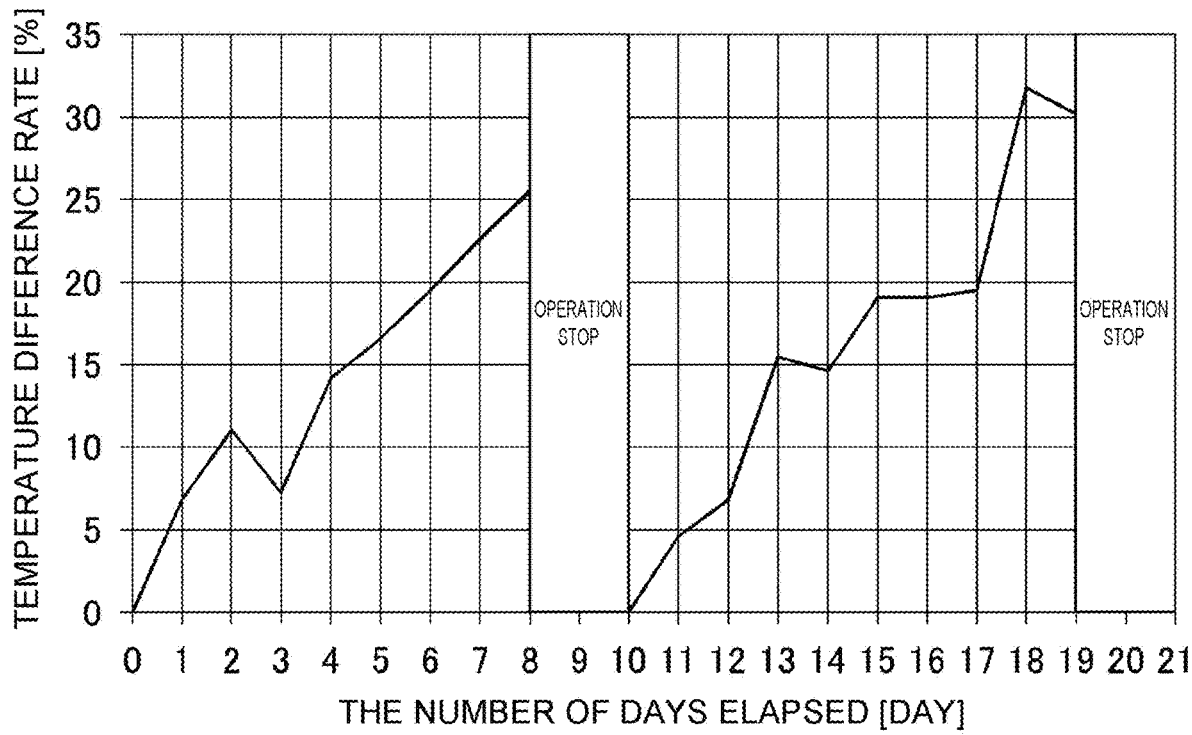
FIG. 4 is a graph showing a change with time in temperature difference rate in Control Test Example 1.

FIG. 2 is a longitudinal section schematic diagram of the tank for describing the method for measuring the temperature. When the height of the tank is defined as 100%, and the bottom of the tank is defined as 0%, a first thermometer was disposed at a position of 12.5% in the height direction of the tank for measuring the temperature of water between around 0 and 25% in the height direction of the tank, and a second thermometer was disposed at a position of 40% in the height direction of the tank for measuring the temperature of water between around 30 and 50% in the height direction of the tank. The temperatures which the first thermometer and the second thermometer indicated were measured temporally, the difference between the temperature which the second thermometer indicated, and the temperature which the first thermometer indicated (the temperature which the second thermometer indicated—the temperature which the first thermometer indicated) with respect to the temperature which the second thermometer indicated was calculated (hereinafter referred to as the "temperature difference rate"). FIG. 3 is a graph showing a change with time in the temperature difference rate in Test Example 1. FIG. 4 is a graph showing a change with time in the temperature difference rate in Control Test Example 1. If the temperature difference rate is 20% or more, it can be said in this system that the sedimentation of sediment has increased.

(Measurement of Turbidity)

Figure 5:
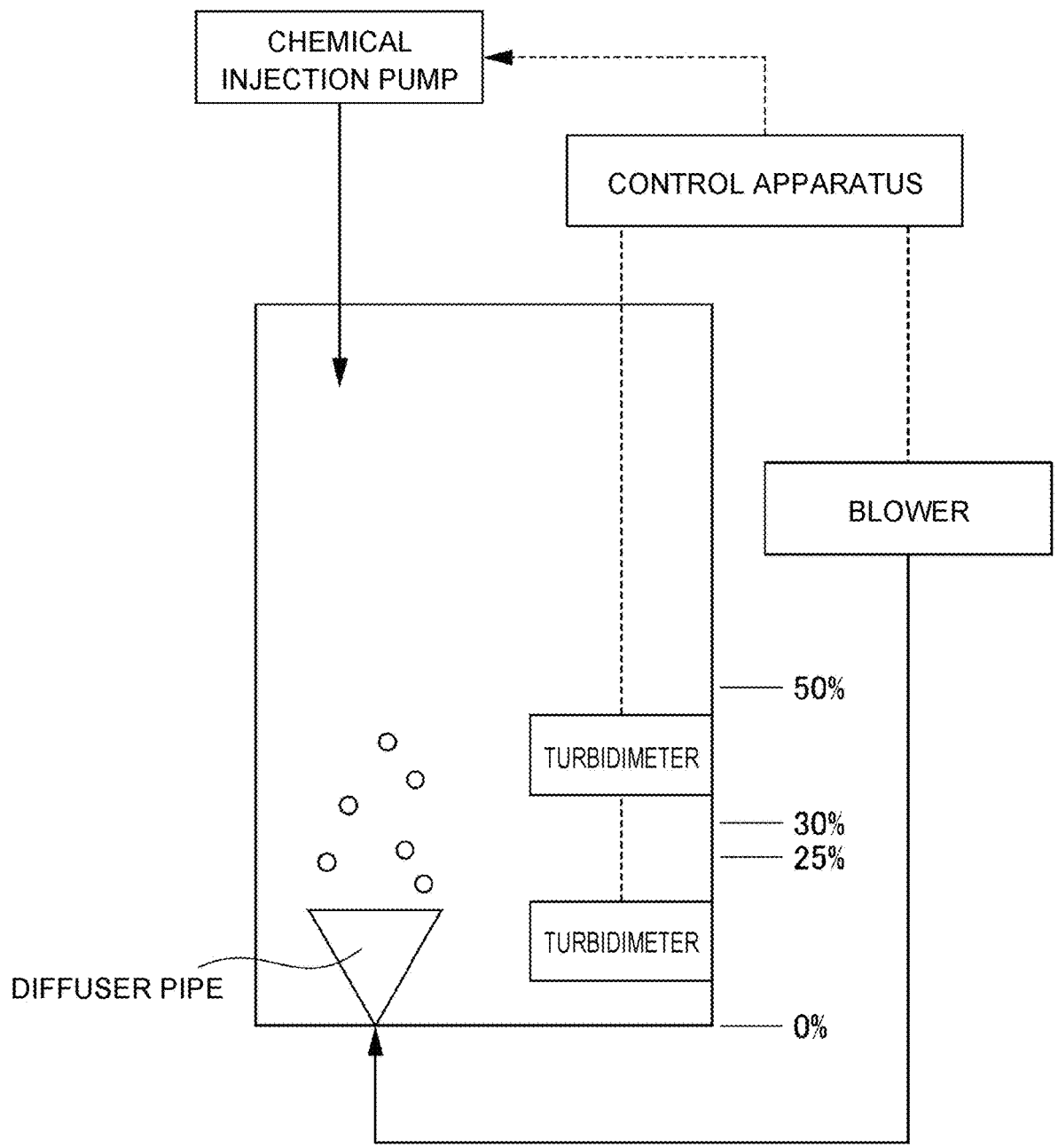
FIG. 5 is a longitudinal section schematic diagram of a tank for illustrating a method for measuring the turbidity.
Figure 6:
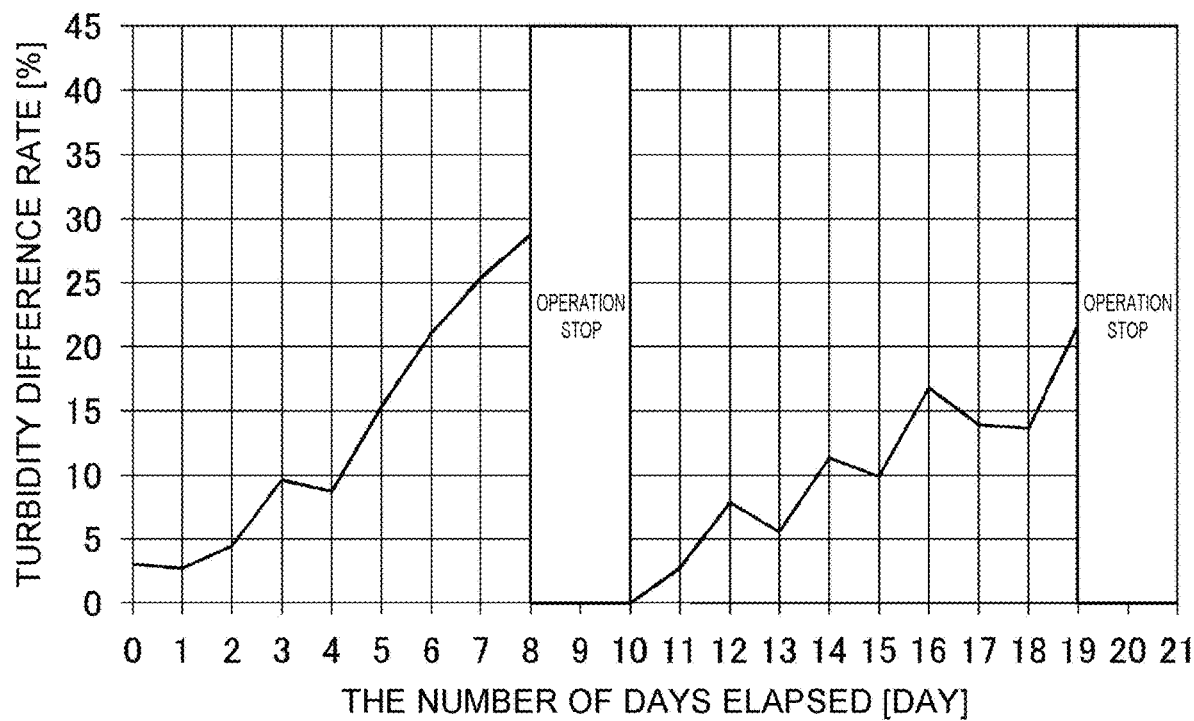
FIG. 6 is a graph showing a change with time in the turbidity difference rate in Test Example 2.
Figure 7:
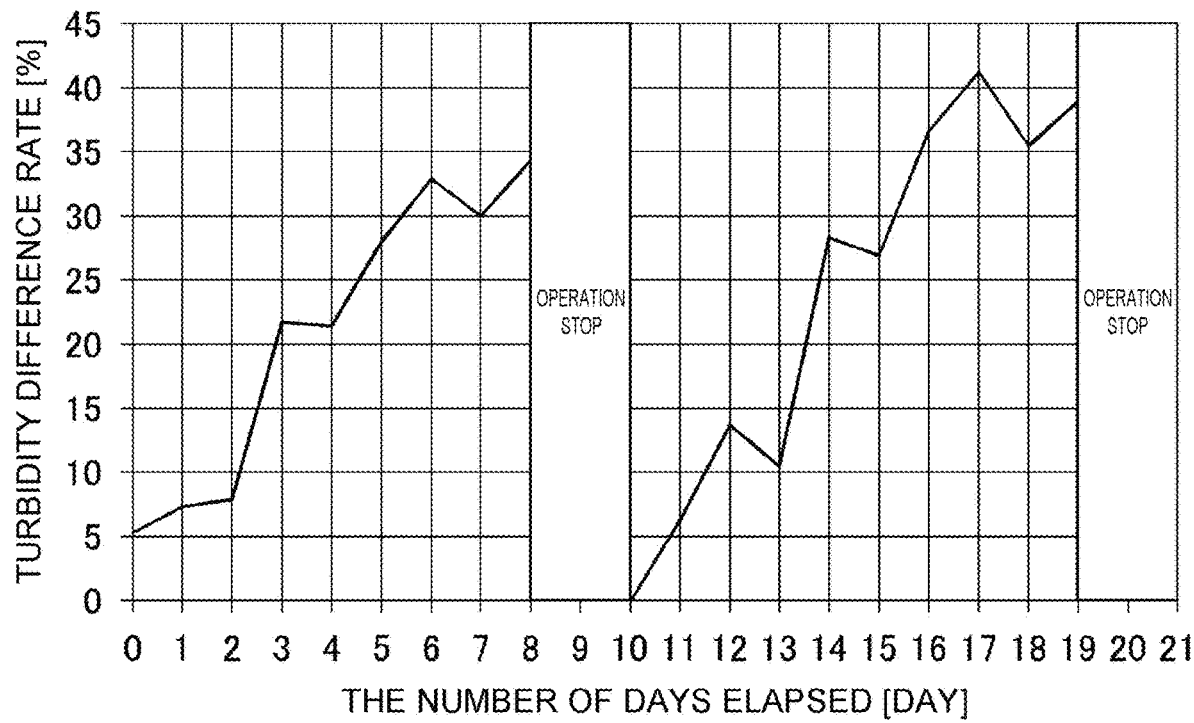
FIG. 7 is a graph showing a change with time in the turbidity difference rate in Control Test Example 2.

FIG. 5 is a longitudinal section schematic diagram of the tank for describing the method for measuring the turbidity. When the height of the tank is defined as 100%, and the bottom of the tank is defined as 0%, a first turbidimeter was disposed at a position of 12.5% in the height direction of the tank for measuring the turbidity of water between around 0 and 25% in the height direction of the tank, and a second turbidimeter was disposed at a position of 40% in the height direction of the tank for measuring the turbidity of water between around 30 and 50% in the height direction of the tank. The turbidities which the first turbidimeter and the second turbidimeter indicated were measured temporally, the difference between the turbidity which the first turbidimeter indicated and the turbidity which the second turbidimeter indicated (the turbidity which the first turbidimeter indicated—the turbidity which the second turbidimeter indicated) with respect to the turbidity which the second turbidimeter indicated was calculated (hereinafter referred to as the "turbidity difference rate"). FIG. 6 is a graph showing a change with time in the turbidity difference rate in Test Example 2. FIG. 7 is a graph showing a change with time in the turbidity difference rate in Control Test Example 2. If the turbidity difference rate is 30% or more, it can be said in this system that the sedimentation of sediment has increased.

(Image Analysis Using Ultrasonic Sensor)

Figure 8:
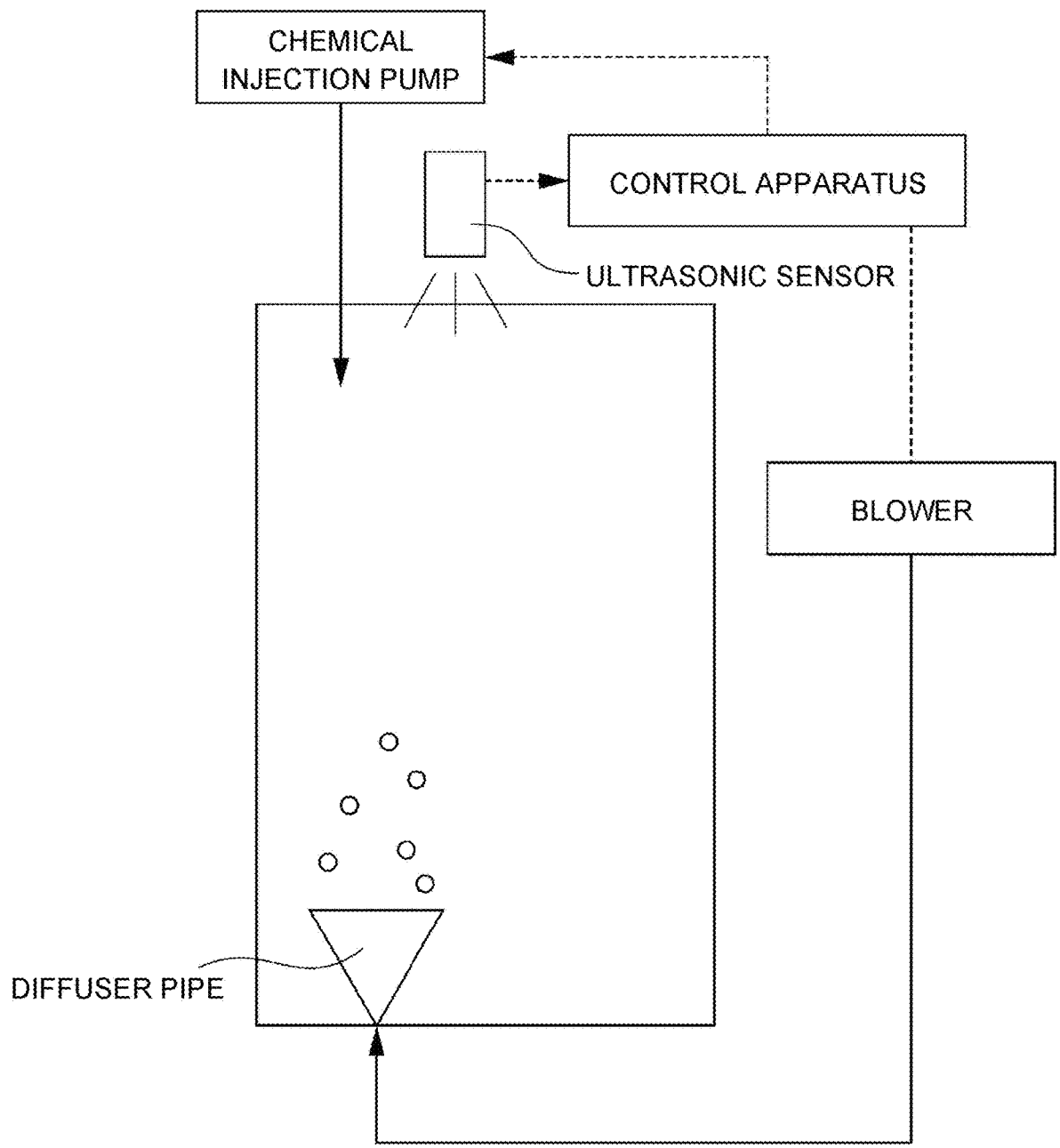
FIG. 8 is a longitudinal section schematic diagram of a tank for illustrating an image analysis method using an ultrasonic sensor.
Figure 9:
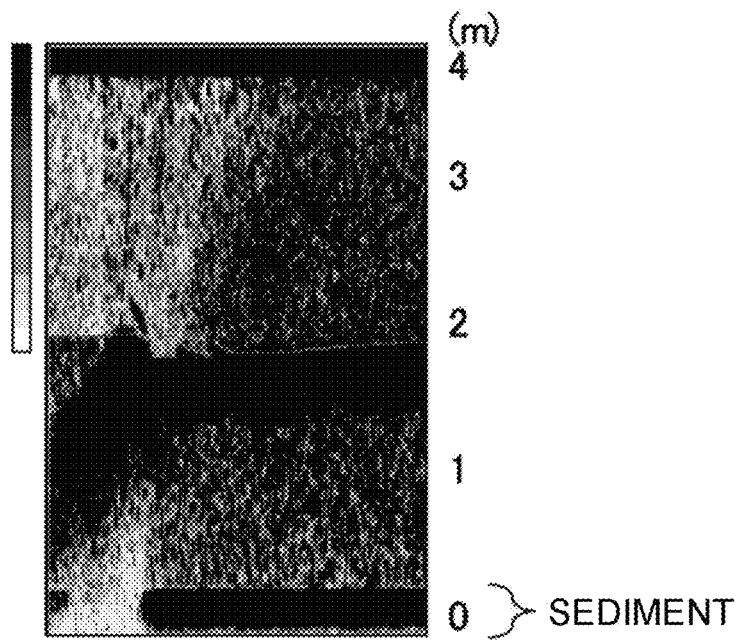
FIG. 9 is a figure showing the image analysis result of sediment in a tank in Test Example 3.
Figure 10:
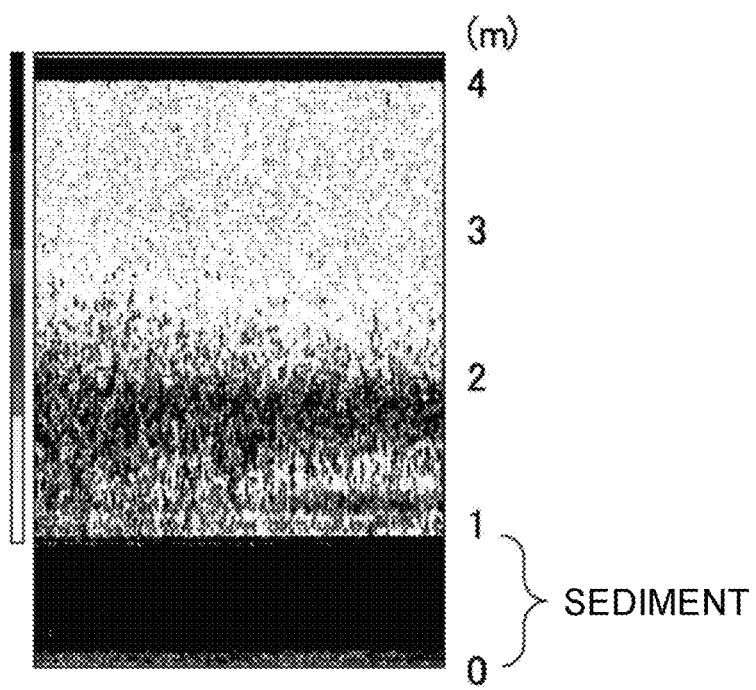
FIG. 10 is a figure showing the image analysis result of sediment in a tank in Control Test Example 3.

FIG. 8 is a longitudinal section schematic diagram of the tank for describing an image analysis method using an ultrasonic sensor. Image analysis was performed on the state of sediment in the tank using an ultrasonic sensor (Kurisonic, manufactured by Kurita Water Industries Ltd.) above the tank. FIG. 9 is a figure showing the image analysis result of sediment in the tank in Test Example 1. FIG. 10 is a figure showing the image analysis result of sediment in the tank in Control Test Example 1.

(Measurement of Sediment Height)

At the time of the operation stop, sediment accumulated at the bottom in the tank was measured using a measure. The sediment heights measured in Test Example 3 and Control Test Example 3 and the sediment heights measured in Test Example 3 and Control Test Example 3 by the image analysis using the ultrasonic sensor directly before the operation stop agreed, respectively.

(Measurement of Oxidation-Reduction Potential)

The oxidation-reduction potential of the water in the upper part of the tank was measured using an oxidation-reduction potentiometer (TRX-98, manufactured by Toko Chemical Laboratories Co., Ltd.).

(Measurement of Reducing Substance Concentration)

At the time of the operation stop, white water sent from the tank with a pump was collected from a sampling valve, and the amount of sulfite ions in the white water was measured based on JIS K 0102:2008.

TABLE 1

| | The Number of days from operation start | Sediment height (cm) | Oxidation-reduction potential (mV) | Reducing substance concentration (mg/l) |
|---|---|---|---|---|
| Test Example 1 | 8 days after | 20 | +2 | less than 2 |
| | 19 days after | 25 | −5 | less than 2 |
| Control Test Example 1 | 8 days after | 50 | −213 | 6 |
| | 19 days after | 60 | −252 | 6 |
| Test Example 2 | 8 days after | 20 | −8 | less than 2 |
| | 19 days after | 15 | +10 | less than 2 |
| Control Test Example 2 | 8 days after | 40 | −178 | 4 |
| | 19 days after | 80 | −187 | 6 |
| Test Example 3 | 19 days after | 20 | −3 | less than 2 |
| Control Test Example 3 | 19 days after | 100 | −372 | 8 |

REFERENCE SIGNS LIST

1: Raw material production step
2: Machine tank
3: Fan pump
4: Screen
5: Inlet
6: Wire Part
7: Wet sheet
8: Press part
9: Drier part
10: White water
11: White water silo
12, 14, 18, 21: Slime control agents
13: Surplus white water tank
15: Solid-liquid separation apparatus
16: Solid content is discharged or collected in raw material system.
17: Filtrate tank
19: Water system introduced into white water circulatory system
20: Treated water tank
22: White water circulatory system
23, 24, 25, 26: Fan pump

The invention claimed is:

1. A method for suppressing sedimentation of suspended substances, wherein the method is for suppressing sedimentation of suspended substances in water at a bottom of a tank disposed in a water system in papermaking equipment, the method comprising:
  an aeration step of blowing an oxygen-containing gas into water which exists in the tank, for stirring and aeration;
  a detection step of detecting a change with time in existence states of suspended substances which exist in the water in the tank by the stirring and the aeration; and
  a control step of feeding at least one of an oxygen-containing gas and a slime control agent to the tank based on a detection result in the detection step during operation of the papermaking equipment to suppress sedimentation of the suspended substances in the tank,
  wherein, in the detection step, the change with time in existence states of the suspended substances which exist in the water in the tank is detected based on a difference of a plurality of measurement results measured in terms of temperature or turbidity by at least either one among a thermometer, a turbidimeter, and an MLSS meter, and wherein the thermometer, the turbidimeter, and the MLSS meter respectively include a plurality of thermometers, a plurality of turbidimeters, and a plurality of MLSS meters disposed in a height direction of the tank.

2. A method for suppressing pitch trouble, wherein the method is for suppressing production of pitch from a tank disposed in a water system in papermaking equipment, the method comprising:
  an aeration step of blowing an oxygen-containing gas into water which exists in the tank, for stirring and aeration;
  a detection step of detecting a change with time in existence states of suspended substances which exist in the water in the tank by the stirring and the aeration; and
  a control step of feeding at least one of an oxygen-containing gas and a pitch control agent to the tank based on a detection result in the detection step during operation of the papermaking equipment to suppress production of pitch in the tank,
  wherein, in the detection step, the change with time in existence states of the suspended substances which exist in the water in the tank is detected based on a difference of a plurality of measurement results measured in terms of temperature or turbidity by at least either one among a thermometer, a turbidimeter, and an MLSS meter, and wherein the thermometer, the turbidimeter, and the MLSS meter respectively include a plurality of thermometers, a plurality of turbidimeters, and a plurality of MLSS meters disposed in a height direction of the tank.

3. A method for detecting sedimentation of suspended substances, wherein the method is for detecting sedimentation of suspended substances in water at a bottom of a tank disposed in a water system in papermaking equipment, the method comprising:

an aeration step of blowing an oxygen-containing gas into water which exists in the tank, for stirring and aeration; and a detection step of detecting sedimentation of suspended substances based on a change with time in existence states of suspended substances which exist in the water in the tank by the stirring and the aeration, wherein, in the detection step, the change with time in existence states of the suspended substances which exist in the water in the tank is detected based on a difference of a plurality of measurement results measured in terms of temperature or turbidity by at least either one among a thermometer, a turbidimeter, and an MLSS meter, and wherein the thermometer, the turbidimeter, and the MLSS meter respectively include a plurality of thermometers, a plurality of turbidimeters, and a plurality of MLSS meters disposed in a height direction of the tank.

\* \* \* \* \*